US009052900B2

(12) United States Patent
Zhang et al.

(10) Patent No.: US 9,052,900 B2
(45) Date of Patent: Jun. 9, 2015

(54) SERDES FAST RETRAIN METHOD UPON EXITING POWER SAVING MODE

(71) Applicant: Oracle International Corporation, Redwood Shores, CA (US)

(72) Inventors: Hongtao Zhang, Sunnyvale, CA (US); Da-wei Huang, San Diego, CA (US); Jianghui Su, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 142 days.

(21) Appl. No.: 13/753,130

(22) Filed: Jan. 29, 2013

(65) Prior Publication Data
US 2014/0215245 A1 Jul. 31, 2014

(51) Int. Cl.
*G06F 1/32* (2006.01)
(52) U.S. Cl.
CPC .................................. *G06F 1/3234* (2013.01)
(58) Field of Classification Search
CPC ...................................................... G06F 1/3234
USPC .......................................... 370/252; 713/323
See application file for complete search history.

(56) References Cited

U.S. PATENT DOCUMENTS

| | | |
|---|---|---|
| 5,661,732 A | 8/1997 | Lo et al. |
| 5,825,785 A | 10/1998 | Barry et al. |
| 5,982,189 A | 11/1999 | Motika et al. |
| 5,987,635 A | 11/1999 | Kishi et al. |
| 5,995,443 A | 11/1999 | Farmwald et al. |
| 6,085,346 A | 7/2000 | Lepejian et al. |
| 6,148,426 A | 11/2000 | Kim et al. |
| 6,205,564 B1 | 3/2001 | Kim et al. |
| 6,249,893 B1 | 6/2001 | Rajsuman et al. |
| 6,310,814 B1 | 10/2001 | Hampel et al. |

(Continued)

FOREIGN PATENT DOCUMENTS

| | | |
|---|---|---|
| EP | 0848329 | 6/1998 |
| TW | 201123641 | 7/2011 |

OTHER PUBLICATIONS

Le, Khanh "SerDes power minimization allows SoC solutions", EE Times, Oct. 31, 2002, http://www.eetimes.com/document.asp?doc_id=1206161, 4 pages. [Retrieved Apr. 2, 2014].

(Continued)

*Primary Examiner* — Charles C Jiang
*Assistant Examiner* — George Atkins, Jr.
(74) *Attorney, Agent, or Firm* — Rory D. Rankin; Meyertons, Hood, Kivlin, Kowert & Goetzel, P.C.

(57) ABSTRACT

Systems and methods for reducing power consumption of systems using serialized data transmission. In a multi-node system, the reiterative steps for the setup of the lanes within links between the nodes produces both a time invariant set of parameters associated with the channel properties of the lanes and a time variant set of parameters associated with receiver clock alignment. The time invariant set is stored in persistent storage. Links may be turned on and turned off. When a link is turned on again, the stored time invariant set may be used as initial values to reconfigure both the time invariant and the time variant sets, thereby greatly reducing the delay to begin using the link again. The reduced delay may significantly speed up the wakening process for the links, thereby encouraging the use of low-power techniques that include tuning off lanes.

20 Claims, 5 Drawing Sheets

(56) References Cited

U.S. PATENT DOCUMENTS

| | | |
|---|---|---|
| 6,330,645 B1 | 12/2001 | Harriman |
| 6,442,723 B1 | 8/2002 | Koprowski et al. |
| 6,560,740 B1 | 5/2003 | Zuraski, Jr. et al. |
| 6,587,979 B1 | 7/2003 | Kraus et al. |
| 6,603,706 B1 | 8/2003 | Nystuen et al. |
| 6,636,997 B1 | 10/2003 | Wong et al. |
| 6,654,920 B1 | 11/2003 | Hetherington et al. |
| 6,658,611 B1 | 12/2003 | Jun |
| 6,658,617 B1 | 12/2003 | Wong |
| 6,661,266 B1 | 12/2003 | Variyam et al. |
| 6,665,828 B1 | 12/2003 | Arimilli et al. |
| 6,671,838 B1 | 12/2003 | Koprowski et al. |
| 6,681,337 B1 | 1/2004 | Smith et al. |
| 6,681,359 B1 | 1/2004 | Au et al. |
| 6,684,358 B1 | 1/2004 | Rajski et al. |
| 6,819,730 B2 | 11/2004 | He |
| 6,901,543 B2 | 5/2005 | Dorsey |
| 6,918,016 B1 | 7/2005 | Magro |
| 6,981,191 B2 | 12/2005 | Dorsey |
| 6,996,760 B2 | 2/2006 | Dorsey |
| 7,224,638 B1 | 5/2007 | Risk et al. |
| 7,313,712 B2 * | 12/2007 | Cherukuri et al. ............ 713/324 |
| 7,844,843 B2 | 11/2010 | Freitas |
| 7,848,367 B2 | 12/2010 | Hornbuckle et al. |
| 7,849,339 B2 | 12/2010 | Lee |
| 8,112,127 B2 | 2/2012 | Yang et al. |
| 2003/0074618 A1 | 4/2003 | Dorsey |
| 2003/0074619 A1 | 4/2003 | Dorsey |
| 2003/0074620 A1 | 4/2003 | Dorsey |
| 2004/0012577 A1 | 1/2004 | Naegle |
| 2004/0041605 A1 * | 3/2004 | Kizer ............................ 327/159 |
| 2008/0158434 A1 * | 7/2008 | Jung et al. .................... 348/730 |
| 2008/0253293 A1 * | 10/2008 | Beyers ......................... 370/242 |
| 2009/0243732 A1 | 10/2009 | Tarng et al. |
| 2010/0115316 A1 | 5/2010 | Diab |
| 2012/0192024 A1 | 7/2012 | Martin et al. |
| 2012/0216084 A1 | 8/2012 | Chun et al. |
| 2012/0314756 A1 * | 12/2012 | Leibowitz et al. ............ 375/233 |

OTHER PUBLICATIONS

"CML RapidIO SerDes (HIPA 21000) IP core", HDL Design House, Oct. 12, 2010, 13 pages.

"High Efficiency Portable Media Player (PMP) Docking Station", Texas Instruments, Jan. 27, 2012, http://www.ti.com/tool/highef-fpmpdock-ref, 2 pages. [Retrieved Sep. 12, 2012].

Suckow, Edmund H. "Basics of High-Performance SerDes Design: Part I", Analog Zone, 8 pages.

"Honeywell's Serializer/Deserializer (SerDes) macro solution enabling high-speed data communications", Honeywell, Jun. 2005, 4 pages.

"Evaluate Serializer-Deserializer (SerDes) Performance by Creating Eye Pattern Templates", Maxim Integrated, Jul. 22, 2008, http://www.maximintegrated.com/app-notes/index.mvp/id/4099, 4 pages. [Retrieved Sep. 12, 2012].

* cited by examiner

SERDES FAST RETRAIN METHOD UPON EXITING POWER SAVING MODE

BACKGROUND OF THE INVENTION

1. Field of the Invention

This invention relates to high performance computing network systems, and more particularly, to reducing power consumption for systems using serialized data transmission.

2. Description of the Relevant Art

The performance of computing systems is dependent on both hardware and software. In order to increase the throughput of computing systems, the parallelization of tasks is utilized as much as possible. To this end, compilers may extract parallelized tasks from program code and hardware may include multiple copies of structures to execute the parallelized tasks. The structures may include functional units, processor cores, and nodes.

Communication between the multiple structures may utilize wide communication buses. As parallelization increases, the communication buses consume more area. Additionally, cross-capacitance, electromigration interference (EMI), and parasitic inductance on wide buses increase the power consumption and noise effects of the computing system. Origins of these effects may include increased operational frequencies and reduced geometric dimensions of the wide buses themselves, bond wires, integrated circuit (IC) package leads, and external supply lines. Channel reflection or ringing, increased propagation delays, and voltage droop are some of the transmission line effects on wide buses.

Reducing the problems with high-speed parallel data transmission may include serializing the parallel data at the transmission side before transmission and then de-serializing the transmitted data on the receiver side upon reception. A pair of Serializer and Deserializer (SERDES) circuits may be used for this purpose.

The power consumption of modern integrated circuits (IC's) has become an increasing design issue with each generation of semiconductor chips. As power consumption increases, more costly cooling systems are utilized to remove excess heat and prevent IC failure. The IC power dissipation constraint is not only an issue for portable computers and mobile communication devices, but also for high-performance stationary computing systems. In order to manage power consumption, chip-level and system-level power management systems typically disable portions of the chip or system when experiencing no utilization for a given time period. This technique may reduce a number of switching nodes and load capacitance being switched.

Sleep modes and clock disabling are used to reduce the power consumption of certain portions. However, some portions may not be disabled if it is expensive to restart the structures. For example, the logic structures for the SERDES circuits typically consume an appreciable amount of time during initialization and configuration. For example, the setup may last millions of cycles. This long latency may be consumed repeatedly during system operation as the SERDES circuits are powered down and later powered back up. Accordingly, there is a significant amount of delay in data traffic, which reduces the benefit of power managing methods.

In view of the above, methods and mechanisms for reducing power consumption of systems using serialized data transmission are desired.

SUMMARY OF THE INVENTION

Systems and methods for reducing power consumption of systems using serialized data transmission are contemplated.

In one embodiment, a computing system includes multiple processors, each located in a respective socket on a printed circuit board. Each processor includes one or more processor cores and one or more on-die caches arranged in a cache hierarchical subsystem. A processor within a socket is connected to a respective off-die memory, such as at least dynamic random access memory (DRAM). A processor within a socket and its respective off-die memory may be referred to as a node. A processor within a given node may have access to a most recently updated copy of data in the on-die caches and off-die memory of other nodes through one or more coherence links.

A coherence link may also be referred to as a link. The links may be bidirectional links or unidirectional links. Each link may include one or more lanes for transmission of data between two respective nodes. A lane may also be referred to as a channel. Parallel data is serialized prior to transmission across a respective lane. The transmitted data may include control, address and data values. A clock signal may be embedded with the serialized data. Channel properties may affect the signal quality.

The setup of the lanes within the links may occur during system initialization. Each of a time invariant set of parameters associated with channel properties of serial data transmission lanes and a time variant set of parameters may be configured. Reiterative and recursive steps within configuration algorithms may be used to determine the time invariant and the time variant sets of parameters. The time for determining the time invariant set of parameters may be appreciably greater than the time for determining the time variant set of parameters. During system operation, both sets of parameters may be readjusted. In some embodiments, in response to receiving a power down indication, the computing system may store the time invariant parameters in persistent storage. The persistent storage maintains the stored data through a power down mode, such as a mode with a respective clock signal disabled. In other embodiments, the time invariant parameters are stored in persistent storage prior to the power down indication. In yet other embodiments, both sets of parameters may be stored in persistent storage.

Re-initialization may occur during a power up operation following an earlier power down operation. The hardware may be controlled by software at times. During power down, control logic within the software may send an indication to the hardware for turning off one or more links between two respective nodes. If the time invariant set of parameters is not yet stored in persistent storage, then the time invariant set is moved to the persistent storage before the nodes enter a low power state, such as an idle state. The links may also be turned off, thereby further reducing power consumption. A subsequent power up or awakening operation may occur responsive to control logic detecting temperature or voltage changes. Alternatively, the power up or awakening operation may occur responsive to control logic detecting a given time interval is reached. The power up or awakening operation may cause a re-adaptation condition to be satisfied. The re-adaptation condition may indicate the lanes within the links are to be re-initialized, thereby, the time invariant and time variant sets of parameters are reconfigured. The stored time invariant set of parameters may be used to update each of the time invariant and the time variant set of parameters. Using the stored time invariant set of parameters as initial values may significantly reduce the time to settle the reconfiguration of the time invariant parameters. The delay to begin using the links for data transport may be greatly reduced.

During the subsequent power up or awakening operation, the stored time invariant set of parameters may be used as initial values for the configuration algorithms used to determine both the time invariant set and the time variant set of parameters. The stored parameters, which are used as initial values, may significantly reduce the time to settle the time invariant parameters. The delay to begin using the links for data transport may be greatly reduced.

These and other embodiments will become apparent upon reference to the following description and accompanying drawings.

Figure 1:
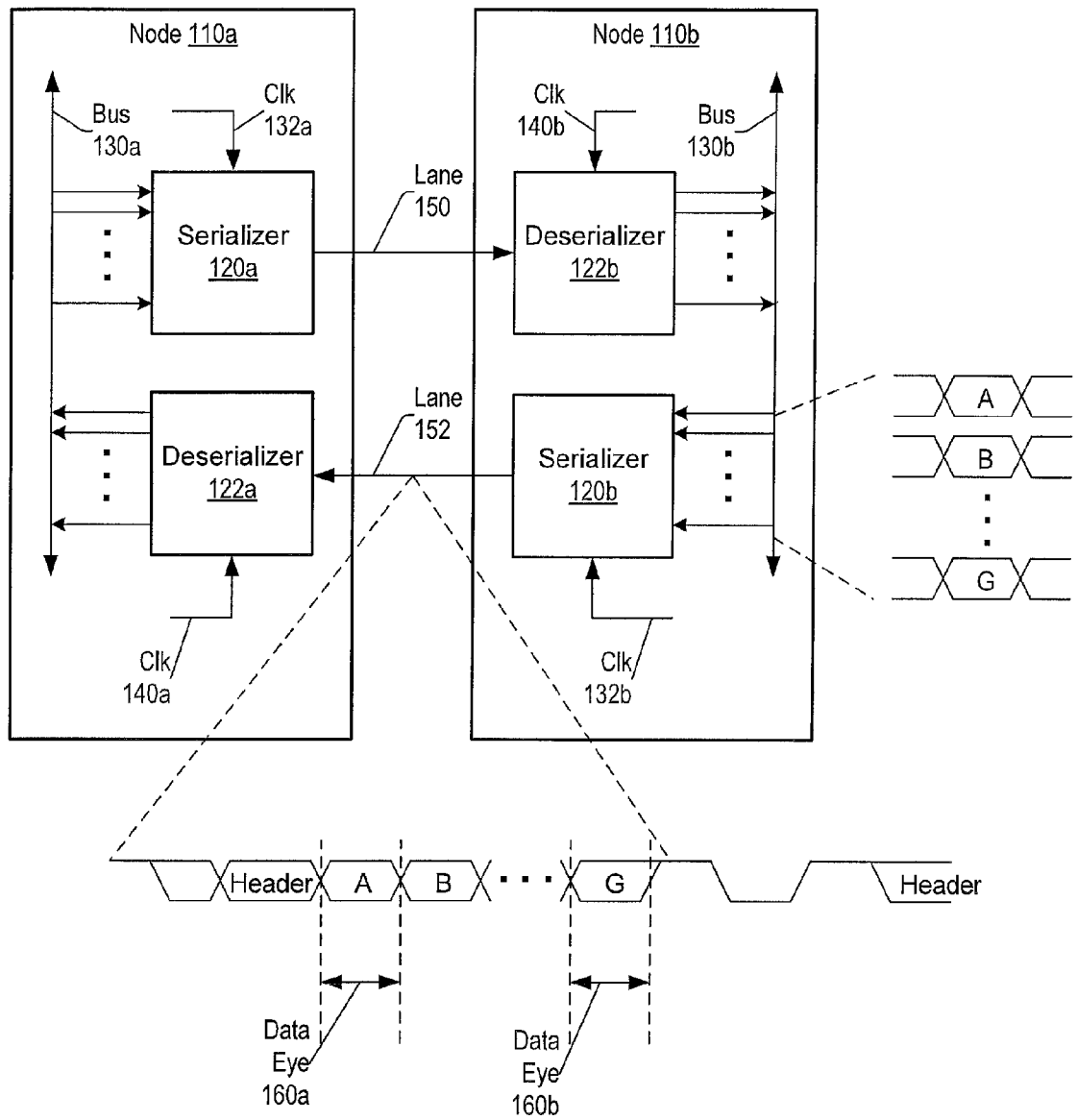
FIG. 1 is a generalized block diagram illustrating one embodiment of a system interconnect.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, a generalized block diagram illustrating one embodiment of a system interconnect 100 is shown. The system includes nodes 110a-110b. Although two nodes are shown in FIG. 1, other embodiments may include a different number of nodes. The nodes may generally represent functional blocks, functional units, routers, chips or chipsets, data transmission buffers such as a transmitter buffer and a receiver buffer, and processors and so forth in a system. The nodes 110a-110b may generally perform data acquisition and data processing. The nodes 110a-110b may use differential signals and differential transmission lines between them. Functional and control blocks and units used for the data acquisition and processing are not shown for ease of illustration. The nodes 110a-110b utilize lanes 150 and 152 for communication.

Parallel information within a given one of the nodes 110a-110b may include control, status, address, parity, and data values. The parallel information may be placed on a respective one of the buses 130a-130b. The parallel information may be serialized by a transmitter block before transmission on a given one of the lanes 150 and 152. The serialized information may be de-serialized by a receiver block upon reception. For example, regarding lane 150, node 110a is the transmitter block and node 110b is the receiver block. Regarding lane 152, node 110b is the transmitter block and node 110a is the receiver block.

Serial transmission protocols may be used on lanes 150 and 152, such as a low voltage differential signaling protocol (LVDS) or differential current mode logic (CML). Serializer and Deserializer (SERDES) circuits may be used by the nodes 110a-110b to perform high-speed serialized data transmission. For example, the node 110a uses serializer 120a and deserializer 122a to form a SERDES circuit. The node 110b uses serializer 120b and deserializer 122b to form a SERDES circuit. Although a single SERDES circuit is shown for each of the nodes 110a-110b, other embodiments may include a different number of SERDES circuits.

SERDES circuits transform wide bit-width, single-ended signal buses and compress them to a few, typically one, differential signal that switches at a much higher frequency rate than the wide single-ended data bus. SERDES circuits may allow a large amount of data to be moved point-to-point. One of multiple SERDES architectures may be selected to perform the high-speed serialized data transmission. For example, the parallel clock SERDES architecture, the embedded clock bits SERDES architecture, the 8-bit/10-bit (8b/10b) or comma encoded SERDES architecture, and the bit interleaving SERDES architecture are some examples of SERDES architectures to use for data transmission.

The nodes 110a-110b with their respective SERDES circuits may be used in many applications. Some examples of applications include wireless network routers, fiber optic communication systems, gigabit Ethernet systems, flat panel displays, and cache coherence links in chip multi-threading (CMT) systems with multiple nodes. In various embodiments, the SERDES circuits are included in an intellectual property (IP) core that is instantiated in multiple blocks within a system. The IP cores with the SERDES circuits may be placed in an interface controller or an application specific integrated circuit (ASIC). Typically, multiple different IP cores with SERDES circuits are designed for a single system. A high-speed mixed-signal design team may consume an appreciable amount of time to design the SERDES circuits according to stringent electrical specifications and to make the circuits ready for mass production.

In the embodiment shown, the SERDES circuits within the nodes 110a-110b utilize an architecture with embedded clock bits. However, another architecture may be selected and used. Node 110b is the transmitter for lane 152. The serializer 120b serializes the parallel information on the bus 130b. The parallel information is generally shown as data A and B-G. The serializer 120b additionally receives the clock signal 132b. The serializer 122b combines the data A and B-G and the clock signal 132b onto one serial signal pair on lane 152.

In various embodiments, the serialized data word with the data A and B-G have a leading header to indicate valid data is being transmitted. In some embodiments, the serialized word may not contain an explicit clock signal. The serializer 120b may continually send data to the deserializer 122a for frequent tuning and updates for both the data and clock recovery circuits. The header may indicate when valid data is being transmitted. The deserializer 122a may utilize one of various algorithms for recovering the explicit data and implicit clock information in the serialized data words being received. The deserializer 122a may attempt to sample the serialized words in a manner to determine the width of the data eyes in the serialized word. The data eyes 160a-160b are two representative data eyes in the serialized word. The deserializer 122a may detect deviations from the expected width of a given data eye and an expected amplitude of received data signals. The deviations may be used to adjust data and clock recovery circuits and to determine clock jitter, clock phase differences, clock frequency drifts, and so forth. The clock data recovery (CDR) circuits in the deserializer 122a may make adjustments on internal clock phases based on received data serialized words and place the receiving clock 140a transition edge in the middle of received data eyes to maximum the timing margin. The deserializer 122b may perform similar steps.

The SERDES circuits attempt to place the transitioning edges of the receiving clock signals in the middle of the data eyes, such as data eyes 160a-160b, for maximum timing margin. Due to channel loss, reflection and crosstalk, the received data serialized words at the deserializers 122a-122b may be significantly distorted. The receiver circuits may recondition and equalize the received signals to maintain a reasonable bit error rate. The equalization settings may be adapted and may be based on the channel properties. Once locked, the deserializer 122a recovers the serialized data values in the serial stream.

An appreciable amount of time is consumed to initialize and configure the SERDES circuits before high-speed data communication begins. The configuration time may consume millions of cycles. During the configuration time, internal phase-locked-loops (PLL's) and clock data recovery (CDR) circuits are stabilized and reach a locked state. Duty cycle corrector (DCC) circuits and phase generators are adjusted. Phase interpolators are adjusted by CDR circuits to place the transitioning edges of sampling circuits in the middle of the data eyes. Equalization circuits starts to recondition the signals to maximize the eye margin and to reduce the bit error rate. The adjustment and reiterative steps consume an appreciable amount of time.

The lanes 150-152 may be part of a high-speed communication bus that is turned off by methods for reducing power consumption. For example, a system may enter a low power mode due to low utilization, high temperature measurements, or other. However, turning back on the lanes 150-152 in the high-speed communication bus consumes an appreciable amount of time, such as millions of cycles, as previously described. The long configuration time may significantly reduce performance and the benefits of turning off the lanes 150-152 in the low power mode.

A portion of the parameters determined during the initialization and configuration may be relatively time invariant values. This time invariant set of parameters may be used to determine a time variant set of parameters and vice-versa. The determination process may be a recursive process. In some embodiments, after the time invariant set of parameters is determined, this set may be stored in persistent storage. The persistent storage maintains the stored data through a power down mode, such as a mode with a respective clock signal disabled. In other embodiments, the time invariant set of parameters is stored in persistent storage in response to receiving a power down indication. In yet other embodiments, each of the time invariant and the time variant set of parameters are stored in persistent storage.

The time invariant set of parameters may be determined to be associated with the channel properties of the lanes 150-152. Therefore, the time invariant set of parameters may take an appreciable amount of time longer to settle than the time variant set of parameters. The time variant set of parameters associated with clock data recovery may be may be faster to adapt and settle. For example, millions of cycles may be consumed for determining the time invariant set of parameters, whereas a few thousand cycles may be consumed for determining the time variant set of parameters. After turning off the lanes 150-152, a subsequent power up or awakening operation may occur. During the awakening operation, the stored time invariant set of parameters may be used as initial values for the configuration steps, thereby significantly reducing the time consumed for adapting and settling final values. In contrast, the time variant set of parameters is reinitialized for the configuration steps. Since initial values are used for the time invariant set of parameters, the delay to begin using the lanes 150-152 for data transport may be greatly reduced. In some embodiments, the time variant set of parameters may be stored in persistent storage and used as initial values during a power up operation. However multiple factors may have changed, such as chip temperature, which cause the initial values to lose benefit.

Figure 2:
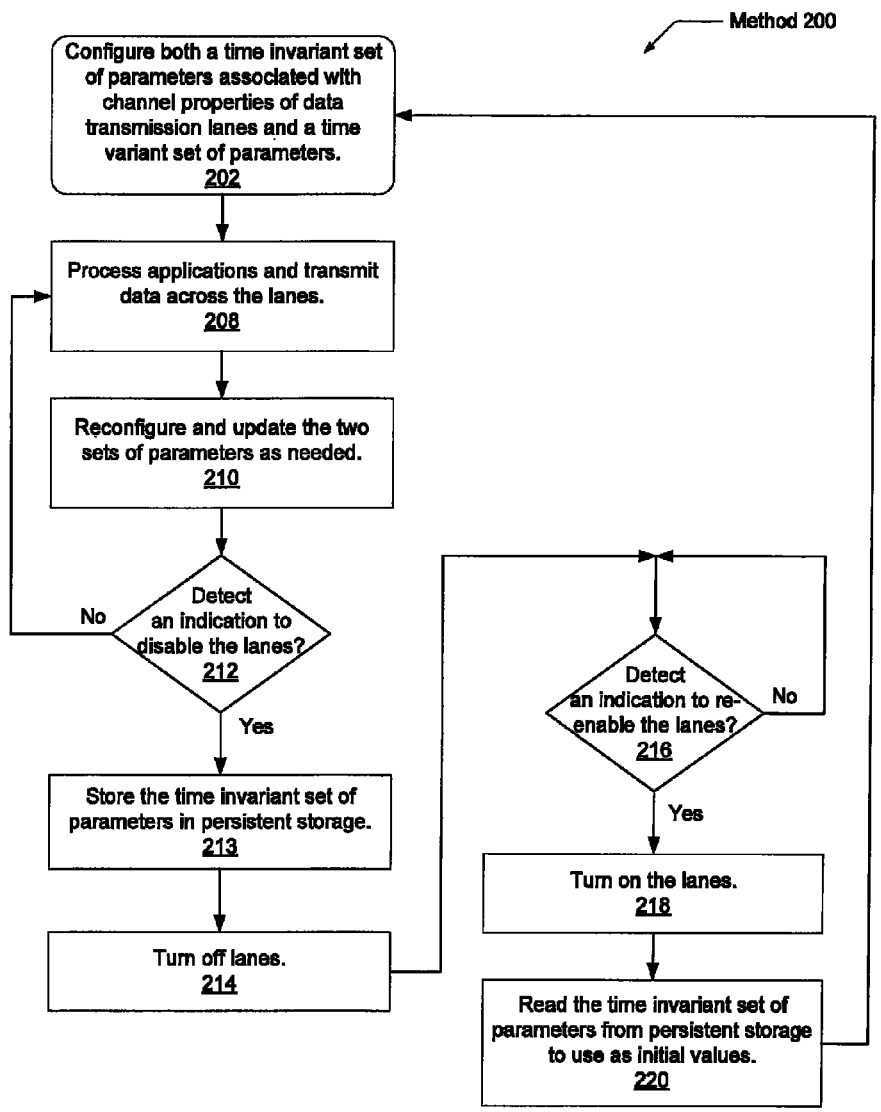
FIG. 2 is a generalized flow diagram illustrating one embodiment of a method for reducing power consumption of systems using serialized data transmission.

Referring now to FIG. 2, a generalized flow diagram of one embodiment of a method 200 for reducing power consumption of systems using serialized data transmission is illustrated. The components embodied in the computing system described above may generally operate in accordance with method 200. For purposes of discussion, the steps in this embodiment are shown in sequential order. However, some steps may occur in a different order than shown, some steps may be performed concurrently, some steps may be combined with other steps, and some steps may be absent in another embodiment.

In block 202, each of a time invariant set of parameters associated with channel properties of serial data transmission lanes and a time variant set of parameters is configured. For example, reiterative steps may be used to stabilize and lock PLL's circuits and duty cycle corrector (DCC) circuits within the serializers of SERDES circuits. In addition, reiterative steps may be used to set line drivers in the serializers and stabilize and lock the clock data recovery (CDR) circuits within the deserializers of the SERDES circuits. Table 1 below depicts examples of transmitter parameters within the serializers of the SERDES circuits. In some embodiments, these parameters are to be stored in persistent storage to avoid reconfiguring the parameters with default or arbitrary initial values during a re-initialization process. Determining final or settled values for these parameters may consume an appreciable amount of time, such as millions of cycles, and may reduce overall system performance with frequent re-initialization of the SERDES circuits if these parameters were reconfigured.

TABLE 1

Transmitter Channel Properties Parameters

| Parameter | SERDES portion | Description |
|---|---|---|
| Duty Cycle | DCC of the Serializer | A multi-bit count value indicating the duty cycle of a received system clock |
| Phase Difference | DCC of the Serializer | A multi-bit count indicating a phase difference between generated clock waveforms used for latching parallel information. |
| Equalizer Setting | Filter-based Equalizer of the Serializer | Coefficients of FIR filter. |
| De-emphasis | Line Driver of the Serializer | Decibel attenuation of the signal amplitude for consecutive same polarity data bits |
| Output Swing | Line Driver of the Serializer | Voltage output swing for serialized data |

As shown, the first two entries of Table 1 include parameters used in blocks associated with a received system clock and generated clock signals within the serializers. Separate clock generators within the serializers may provide clock signals for latching, multiplexing, and serializing the parallel information. These generated clock signals may have a lower frequency than the serialized stream. The slower generated clock signals for latching, multiplexing, and serializing the parallel information may be generated from a system clock. The duty cycle of the system clock may degrade as the system clock is distributed through a large clock distribution network. The duty cycle corrector (DCC) circuits within the serializers adjust the incoming clock signal to provide a clock signal without the degradation. During setup, the PLL's and clock generators are stabilized and the DCC circuits within the serializers are adjusted. Counters within a sampling unit may be used to determine the duty cycle and the phase difference between generated clock signals within the serializer.

The third entry in Table 1 includes coefficients for a three-tap finite impulse response (FIR) filter-based equalizer. Transmitter units within the serializers that perform the multiplexing and serializing of the parallel information into a single high-speed differential output also sends the output to the FIR filter-based equalizer. The FIR filter-based equalizer processes the serialized output to compensate for frequency-dependent channel loss characteristics. The values of the filter coefficients may be determined by a de-emphasis technique. De-emphasis is the technique of changing the amplitude of the low frequency components of the serialized output or changing the attenuation of the non-transitioning bits. Afterward, a pre-driver and a driver boost the differential signal carrying the serialized output onto the channel and provide termination. For example, the driver may provide a nominal 100-ohm termination.

The last two entries of Table 1 may include parameters for the line drivers within the serializers. Line drivers within the serializers send the serialized data onto the lanes, which may be printed circuit board (PCB) traces. As previously described, the line drivers may use a de-emphasis technique to pre-equalize the output waveforms. When multiple bits of the same polarity are output in succession, all the subsequent bits are driven with an amplitude below a previous bit. De-emphasizing allows the low frequency components of the output waveform to exhibit less Inter-Symbol Interference (ISI). The corresponding parameters may include programmable multi-bit coefficients. Swing control circuits determine the voltage swing for voltage-controlled oscillators (VCO's) within the serializer. Additionally, swing control circuits determine the voltage output swing to for the serialized data word to transmit on the serial stream. Differential current mode logic (CML) buffers may be used to drive the serialized data. Programmable multi-bit coefficients may represent different ranges of voltage swings.

An off-chip low frequency crystal may be provided to a phase-locked-loop (PLL) multiplier within the serializers to limit power consumption across the die. The internal high-speed generated clock from the PLL maintains a constant phase alignment with the other generated and slower clock signals used for latching the parallel information to be serialized. The high-speed clock signal from the PLL may use a same frequency as the serialized stream. The high-speed rate of the serialized stream, which may be multiple gigabits per second, provides a small clock bit period to maintain the constant phase alignment over temperature, supply voltage and process corner ranges. During setup or initialization, the PLL's within the serializers are configured and stabilized before locking. In some embodiments, when the PLL's and the clock generators are stabilized, one or more parameters may be stored in persistent storage in addition to the parameters shown in Table 1.

Table 2 below depicts examples of receiver parameters within the deserializers of the SERDES circuits. Similar to the parameters shown in Table 1, the parameters shown in Table 2 may be stored in persistent storage to be used as initial values during a re-initialization process. Determining these parameters without the stored initial values during re-initialization may consume an appreciable amount of time, such as millions of cycles, and may reduce overall system performance with frequent re-initialization of the SERDES circuits if these parameters were reconfigured.

TABLE 2

Receiver Channel Properties Parameters

| Parameter | SERDES portion | Description |
| --- | --- | --- |
| Gain | VGA of the Deserializer | Gain of a variable gain amplifier (VGA) that receives the serialized data on the differential pair. |
| Offset | VGA of the Deserializer | Common mode offset of the VGA that receives the serialized data on the differential pair. |
| Equalizer Setting | Input of the Deserializer | Value that selects one of multiple distinct response curves preprogrammed to match the response of various lengths of a PCB trace |
| Filter Coefficients | Input of the Deserializer | Adaptive filter coefficients of a multi-tap decision feedback equalization (DFE) filter |

As shown, the first two entries of Table 2 include gain and offset parameters used in a variable gain amplifier (VGA) within the deserializers that receives the serialized data. Similar to the line drivers of the serializers, the receiving circuitry of the deserializers present a termination to the incoming differential signal carrying the serialized data. For example, a nominal 100-ohm termination may be used and presented. The serialized data may pass through the VGA to a linear equalizer, such as a continuous time linear equalizer (CTLE). The equalizer may process the received serialized data to compensate for transmission channel losses. The setting or parameter associated with the equalizer selects one of multiple distinct response curves preprogrammed to match the response of various lengths of the PCB trace used for the respective channel.

Following the linear equalizer, a non-linear multi-tap adaptive decision feedback equalizer (DFE) compensates for intersymbol interference (ISI). The DFE uses multi-bit coefficients. At a same time, the CDR circuits track the phase and frequency of the incoming serialized stream. Using the traced information, a receiver clock signal may be centered at an ideal spacing relative to the data eye, such as in the middle of the data eye for maximum timing margin. Finally, phase interpolators and retimer circuits set timing for sampler circuitry to convert the serialized stream to parallel information. Determining the parameters shown in both Table 1 and Table 2 during a configuration stage in addition to determining parameters for the PLL's and CDR circuits may consume an appreciable amount of time. Additionally, the time variant set of parameters is configured. This set of parameters includes parameters for CDR phase tracking and alignment. This set of parameters may be continually adjusted over time.

After configuration of the SERDES circuits completes, the circuits and the respective lanes may be used. In block 208, one or more applications are processed and data is transmitted across the lanes. In block 210, the time variant set of parameters may be reconfigured as needed as temperature and voltage changes are detected. These changes affect the generation of receiver clock signals to be aligned to the center of the data eye. The stored time invariant set of parameters may be used to reconfigure the time variant set of parameters. Scheduling logic for the lanes may account for any reconfiguration processes.

If an indication to disable the lanes is detected (conditional block 212), then in block 213, the time invariant set of parameters is stored in persistent storage. The time invariant set of parameters may include the parameters shown in both Table 1 and Table 2. The time invariant set of parameters is associated with channel properties of lanes between a serializer in a transmitter block and a deserializer in a receiver block. In other embodiments, the time variant set of parameters may additionally be stored in persistent storage. The persistent storage may maintain data storage through a power down mode, wherein a respective clock signal is disabled. The persistent storage may be organized as a table. This table may be later accessed by a state machine or other logic to obtain initial values to be used in a reconfiguration process for the two sets of parameters. In block 214, the lanes are turned off. The disable indication may be asserted in response to the power management logic detects a high temperature condition. Alternatively, the indication may be asserted in response to the power management logic detects low utilization of the lanes. Other conditions and control logic blocks may be used to assert the indication to disable the lanes.

If an indication to re-enable the lanes is detected (conditional block 216), then in block 218, the lanes are turned on again. The indication may be asserted in response to power management logic detects a low temperature condition. The indication may also be asserted in response to detecting voltage changes or detecting a given time period or interval is reached. Alternatively, the indication may be asserted in response to power management logic detects increasing utilization of the lanes past a given threshold. Other conditions and control logic blocks may be used to assert the indication for a re-awakening operation and re-enable the lanes. The power up or awakening operation may cause a re-adaptation condition to be satisfied. The re-adaptation condition may indicate the lanes within the links are to be re-initialized, thereby, the time invariant and time variant sets of parameters are reconfigured. The stored time invariant set of parameters may be used to update each of the time invariant and the time variant set of parameters. Using the stored time invariant set of parameters as initial values may significantly reduce the time to settle the reconfiguration of the time invariant parameters. The delay to begin using the links for data transport may be greatly reduced.

In block 220, the time invariant set of parameters stored in persistent storage is read. By reading the time invariant set of parameters from persistent storage and using them as initial values for the configuration steps, rather than re-determining the parameters without these initial values, an appreciable amount of time may be saved during the re-awakening operation. For example, millions of cycles may be saved during the re-awakening operation. The reiterative steps used for aligning the generated clock signals and the serialized data stream may consume thousands of cycles, whereas the determination for the time invariant set of parameters, such as the DFE coefficients, without using the stored initial values may consume millions of cycles. Control flow of method 200 then moves from block 220 to block 202 where both the time variant set of parameters and the time invariant set of parameters may be determined. Using the time invariant values stored in persistent storage, the re-awakening operation may greatly reduce its latency. Frequent disabling and re-enabling of the lanes connected to the SERDES circuits may be performed without appreciably reducing system performance.

Figure 3:
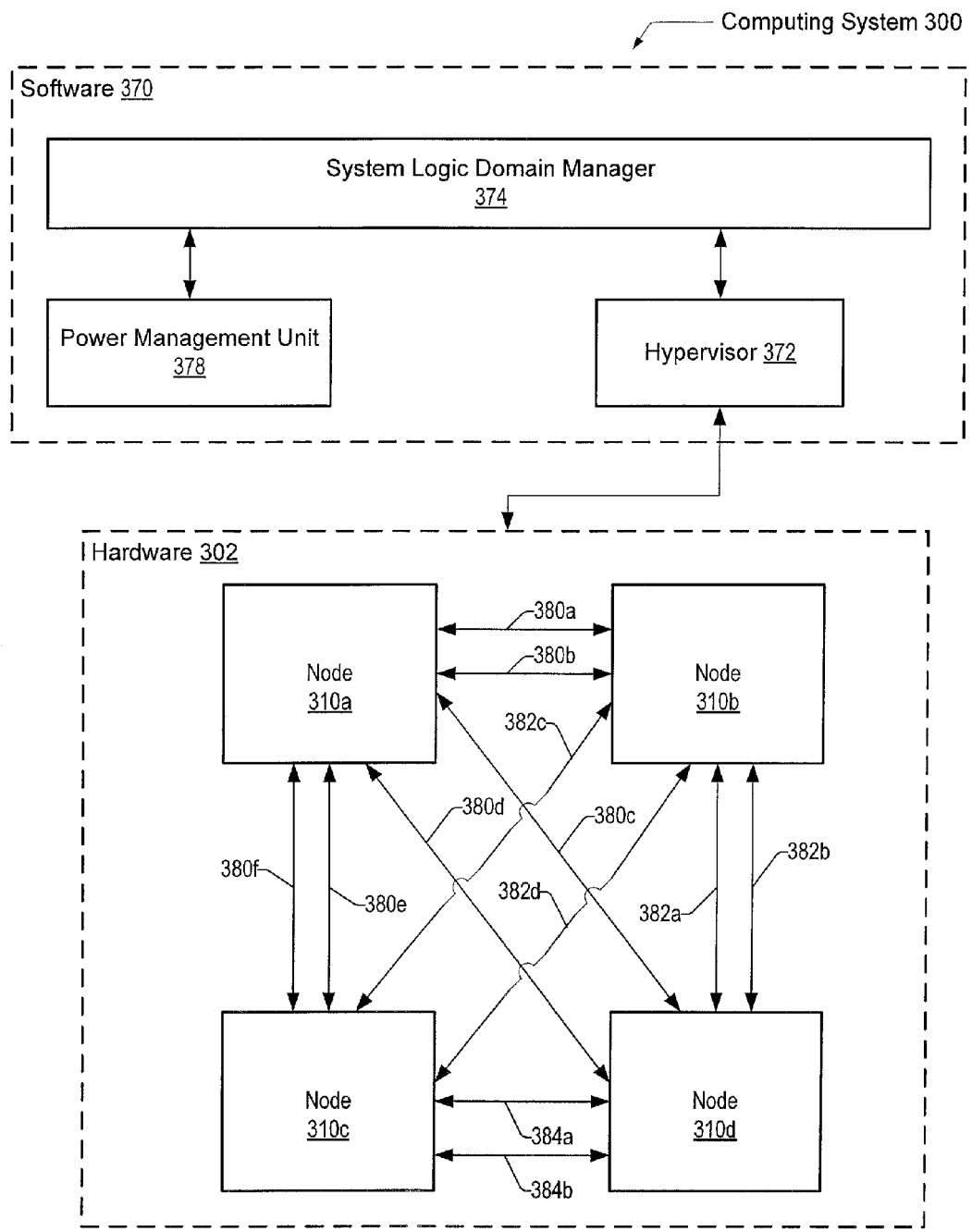
FIG. 3 is a generalized block diagram illustrating one embodiment of a computing system.

As previously described, some examples of applications utilizing SERDES circuits include wireless network routers, fiber optic communication systems, gigabit Ethernet systems, flat panel displays, and cache coherence links in chip multi-threading (CMT) systems with multiple nodes. An example of the cache coherence links utilizing SERDES circuits is provided next as an illustration of frequent disabling and re-enabling lanes connected to SERDES circuits. Although a computing system is used as an example, the steps and techniques described may be applied to other systems such as network/communication systems and other data transmission systems. Referring to FIG. 3, a generalized block diagram illustrating one embodiment of a computing system 300 is shown. Computing system 300 includes hardware 302 and software 370. The software 370 may include a system logic domain manager 374 for controlling the operating states of the processors and other components within the computing system 300.

The manager 374 may communicate with a power management unit 378 that includes policies and algorithms for changing operating states for different operating points. The power management unit 378 may send notifications to disable portions of the computing system 300 when it detects or is otherwise informed that the portion is unused for a given period of time. Similarly, power-performance states (P-states) may be adjusted based on compute unit usage feedback and/or temperature measurements. The software may also include a hypervisor 372. The hypervisor 372 is used to support a virtualized computing system.

The hardware 302 includes nodes 310a-310d. Although four nodes are shown in FIG. 3, other embodiments may include a different number of nodes. As shown in FIG. 3, each one of the nodes 310a-310d may utilize one or more coherence links for inter-node access of processor on-die caches and off-die memory of another one of the nodes 310a-310d. In the embodiment shown, the nodes 310a-310d use coherence links 380a-380f, 382a-382d, and 384a-384b. As used herein, coherence links may also be referred to as simply links. Although two links are used between any two nodes in FIG. 3, other embodiments may comprise a different number of links between any two nodes. In addition, although the links 380a-380f, 382a-382d, and 384a-384b are shown as bidirectional links, in other embodiments, one or more links may be unidirectional.

Each of the links 380a-380f, 382a-382d, and 384a-384b may include multiple lanes. For example, each of the links may include 12 lanes although any number of lanes may be possible and contemplated. Each of the lanes may utilize SERDES circuits, which are not show for ease of illustration. For bidirectional links, there are one or more lanes for each direction between two respective nodes. For unidirectional links, there are lanes for only one direction between two respective nodes. In various embodiments, the links 380a-380f, 382a-382d, and 384a-384b include high-bandwidth, low-latency point-to-point communication. In addition, the interconnect technology uses a cache coherency extension. Examples of the technology include HyperTransport and QuickPath. Other proprietary coherence link technologies may also be selected for use on links 380a-380f, 382a-382d, and 384a-384b.

The dedicated cache coherence links 380a-380f, 382a-382d, and 384a-384b may provide communication separate from other communication channels such as a front side bus protocol, a chipset component protocol, and so forth. As shown, the multi-node computing system 300 is expanded in a "glueless" configuration that does not use an application specific integrated circuit (IC) hub or a full custom IC hub for routing. Alternatively, the multi-node computing system 300 may be expanded with the use of a hub, especially when the number of sockets reaches an appreciable value and development costs account for the extra hardware and logic.

The lanes within the links 380a-380f, 382a-382d, and 384a-384b may be printed circuit board (PCB) traces. Regarding the nodes 310a-310d, whether socket or surface mount technology is used, a processor and its respective off-die memory may be referred to as a node. A socket is an electrical and mechanical component on a printed circuit board. The socket may also be referred to as a central processing unit (CPU) socket. Without soldering, the socket connects the processor to other chips and buses on the printed circuit board including the links 380a-380f, 382a-382d, and 384a-384b. Sockets are typically used in desktop and server computers. In contrast, portable computing devices, such as laptops, use surface mount processors. Surface mount processors consume less space on a printed circuit board than a socket, but also need soldering.

Whether socket or surface mount technology is used, a computing system may include multiple processors located on one or more printed circuit boards (PCB's). Multiple processors located on multiple PCB's may be connected through a backplane in a server box, a desktop, a laptop, or other chassis. Both PCB traces and backplanes may provide a lossy and noisy environment for serialized data transmission on the lanes within the links 380a-380f, 382a-382d, and 384a-384b. The previously described first set of parameters may be used to compensate for the lossy and noisy environment at the expense of consuming an appreciable amount of time to configure the parameters.

Each processor of the multiple processors is connected to a respective off-die memory. The respective off-die memory may include at least a dynamic random access memory (DRAM). Through the use of coherence links 380a-380f, 382a-382d, and 384a-384b, and the respective SERDES circuits, each processor is connected to one or more other processors in the system, and has access to on-die caches and a respective off-die memory of the one or more other processors. Again, whether socket or surface mount technology is used, a processor and its respective off-die memory may be referred to as a node. A processor within a given node may have access to a most recently updated copy of data in the on-die caches and off-die memory of other nodes through the coherence links 380a-380f, 382a-382d, and 384a-384b, and the respective SERDES circuits. The dedicated cache coherence links in a multi-socket system may provide near-linear scaling of performance with thread count.

The processor within a node may include one or more general-purpose processor cores and one or more on-die caches arranged in a cache hierarchical subsystem. The general-purpose processor cores may execute instructions according to a given general-purpose instruction set. Alternatively, a processor within a node may include heterogeneous cores, such as one or more general-purpose cores and one or more application specific cores. The application specific cores may include a graphics processing unit (GPU), a digital signal processor (DSP), and so forth. The off-die memory may be connected to a respective memory controller for the processor. The DRAM may include one or more dual in-line memory module (DIMM) slots. The DRAM may be further connected to lower levels of a memory hierarchy, such as a disk memory and offline archive memory.

Memory controllers within the nodes 310a-310b may include control circuitry for interfacing to memories. Additionally, the memory controllers may include request queues for queuing memory requests. In one embodiment, the coherency points for addresses within the computing system 300 are the memory controllers within the nodes 310a-310b connected to the memory storing bytes corresponding to the addresses. In other embodiments, the cache coherency scheme may be directory based, and the coherency point is the respective directory within each of the nodes 310a-310b. The memory controllers may include or be connected to coherence units. In a directory-based cache coherence scheme, the coherence units may store a respective directory. These coherence units are further described later. Additionally, the nodes 310a-310b may communicate with input/output (I/O) devices, which may include computer peripheral devices. Alternatively, each one of the nodes 310a-310b may communicate with an I/O bridge, which is coupled to an I/O bus.

The hardware 302 may be connected to software 370. During system startup and initialization, the manager 174 may send control signals to the nodes 310a-310d for performing configuration or training of the lanes and SERDES circuits within the links 380a-380f, 382a-382d, and 384a-384b. The training may consume an appreciable amount of time to determine both the first set of parameters and the second set of parameters as previously described. The power management unit 378 or other control logic may determine one or more components in the computing system 300 may be turned off or enter an idle state for the benefit of power management. The components may include one or more of links 380a-380f, 382a-382d, and 384a-384b. Turning off one or more of the links and later turning on again the one or more links may consume an appreciable amount of time for retraining the one or more links. However, if the first set of parameters is stored in persistent storage, these values may be read during retraining. The latency of retraining the one or more links may be greatly reduced by reading the first set of parameters, rather than re-determining the first set of parameters. Therefore, the power management policies and algorithms may include frequent disabling of one or more of the links 380a-380f, 382a-382d, and 384a-384b.

Figure 4:
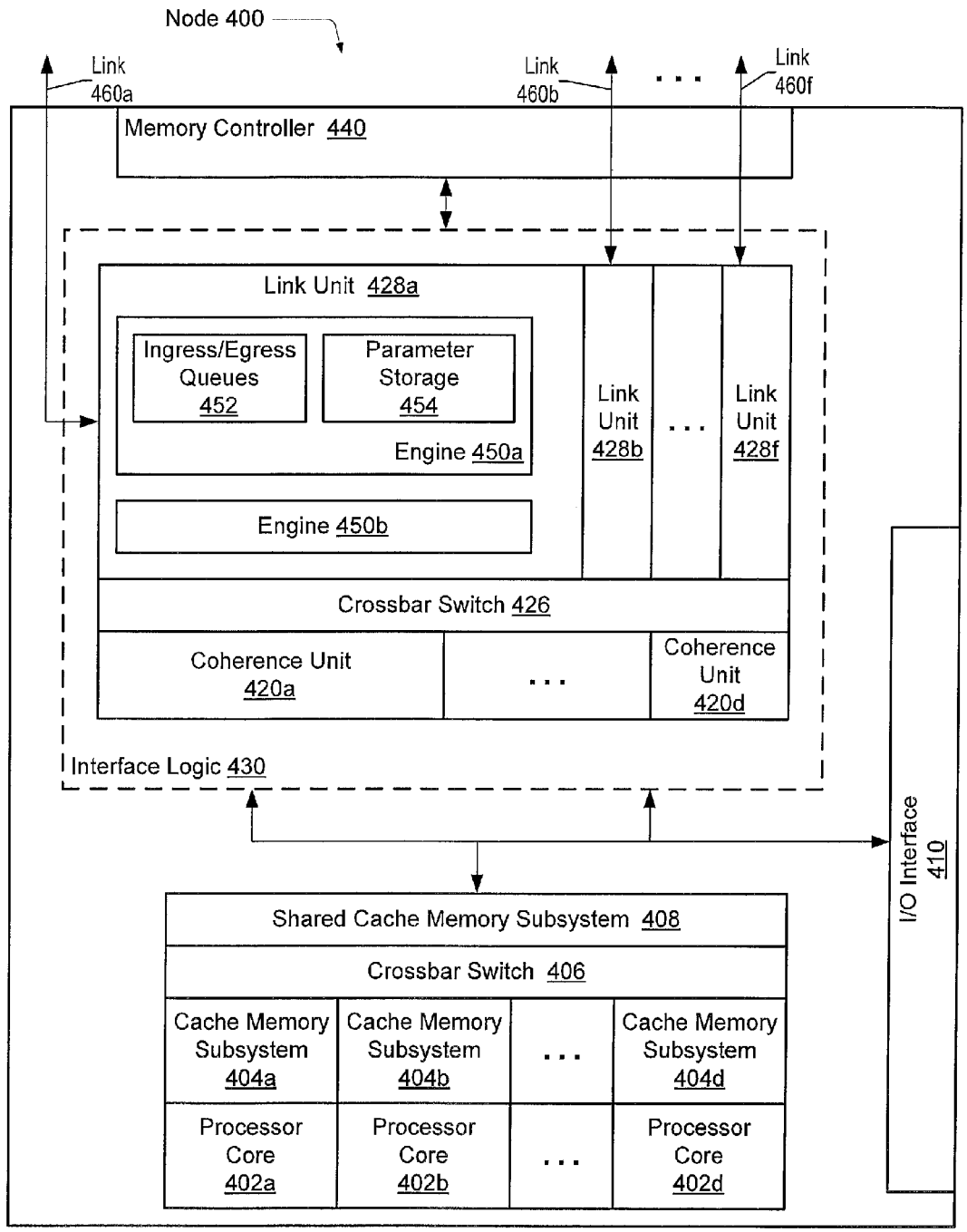
FIG. 4 is a generalized block diagram illustrating one embodiment of an exemplary node.

Referring now to FIG. 4, a generalized block diagram of one embodiment of an exemplary node 400 is shown. Node 400 may include memory controller 440, input/output (I/O) interface logic 410, interface logic 430, and one or more processor cores 402a-402d and corresponding cache memory subsystems 404a-404d. In addition, node 400 may include a crossbar switch 406 and a shared cache memory subsystem 408. In one embodiment, the illustrated functionality of processing node 400 is incorporated upon a single integrated circuit.

In one embodiment, each of the processor cores 402a-402d includes circuitry for executing instructions according to a given general-purpose instruction set. For example, the SPARC® instruction set architecture (ISA) may be selected. Alternatively, the x86®, x86-64®, Alpha®, PowerPC®, MIPS®, PA-RISC®, or any other instruction set architecture may be selected. Each of the processor cores 402a-402d may include a superscalar microarchitecture with one or more multi-stage pipelines. Also, each core may be designed to execute multiple threads. A multi-thread software application may have each of its software threads processed on a separate pipeline within a core, or alternatively, a pipeline may process multiple threads via control at certain function units.

Generally, each of the processor cores 402a-402d accesses an on-die level-one (L1) cache within a cache memory subsystem for data and instructions. There may be multiple on-die levels (L2, L3 and so forth) of caches. In some embodiments, the processor cores 402a-402d share a cache memory subsystem 408. If a requested block is not found in the caches, then a read request for the missing block may be generated and transmitted to the memory controller 440. Interfaces between the different levels of caches may comprise any suitable technology.

The interface logic 430 may generate control and response packets in response to transactions sourced from processor cores and cache memory subsystems located both within the processing node 400 and in other nodes. The interface logic 430 may include logic to receive packets and synchronize the packets to an internal clock. The interface logic may include one or more coherence units, such as coherence units 420a-420d. The coherence units 420a-420d may perform cache coherency actions for packets accessing memory according to a given protocol. The coherence units 420a-420d may include a directory for a directory-based coherency protocol.

In various embodiments, the interface logic 430 may include link units 428a-428f connected to the coherence links 460a-460f. The link units 428a-428f may utilize SERDES circuits for data transport on the links 460a-460f. A crossbar switch 426 may connect one or more of the link units 428a-428f to one or more of the coherence units 420a-420d. In various embodiments, the interface logic 430 is located outside of the memory controller 440 as shown. In other embodiments, the logic and functionality within the interface logic 430 may be incorporated in the memory controller 440.

As shown, each one of the link units 428a-428f includes engines 450a-450b. Although two engines are shown in FIG. 4, in other embodiments, another number of engines may be used. In some embodiments, a given one of the engines 450a-450b is associated with 4 lanes of serialized data transmission. If a given one of the links 460a-460f includes 12 lanes, then a corresponding one of the link units 428a-428f includes 3 engines. In some embodiments, each one of the engines 450a-450b may include ingress and egress queues 452 for a respective lane. In other embodiments, a given one of the engines 450a-450b may include ingress and egress queues 452 for a given number of lanes, such as four lanes. Each one of the link units 428a-428f may also include configuration and status registers and persistent parameter storage 454 for storing the first set of parameters associated with channel properties of lanes.

In some embodiments, direct link data credits may be maintained within the link unit 428a on node 400. Each one of the links 460a-460f may have an initial amount of direct link data credits. One or more credits may be debited from a current amount of direct link data credits when a data request or data is received and placed in a respective ingress queue. Alternatively, one or more credits may be debited from the current amount of direct link data credits when data requested by another node is received from a corresponding cache or off-die memory and placed in an egress queue.

One or more credits may be added to a current amount of direct link data credits when a data request or data is processed and removed from a respective ingress queue. Alternatively, one or more credits may be added to the current amount of direct link data credits when requested data is sent on a given link and removed from an egress queue. Requests, responses, actual data, type of data (e.g. received requested data, received forwarding data, sent requested data, sent forwarding data) and a size of a given transport, such as a packet size, may each have an associated weight that determines the number of credits to debit or add to the current amount of direct link data credits. The credits may be used by power management logic or other control logic for determining whether to turn off and turn on again particular links. Turning off and turning on again the links may be part of a power management algorithm.

In some embodiments, the interface logic 430 may determine utilization of links by an input rate of incoming data traffic on the links. The interface logic 430 may monitor this incoming traffic and make determinations for generating traps based on the incoming traffic. Alternatively, the interface logic may monitor ingress and egress queues for the links. In yet other examples, the links may be turned on and off based on the p-state of corresponding nodes as determined by a power management unit.

It is noted that either hardware or software may check for other conditions to be satisfied when determining whether to enable and disable links. For example, a given link may be used for a given packet type. The given link may be turned off. Later, a respective queue for incoming packets may fill as an application that uses the given packet type begins execution. The given link may be the only link between the same 2 nodes as the given link capable of handling the given packet type. Therefore, the given link may be turned on despite its bandwidth utilization being low, or zero.

Figure 5:
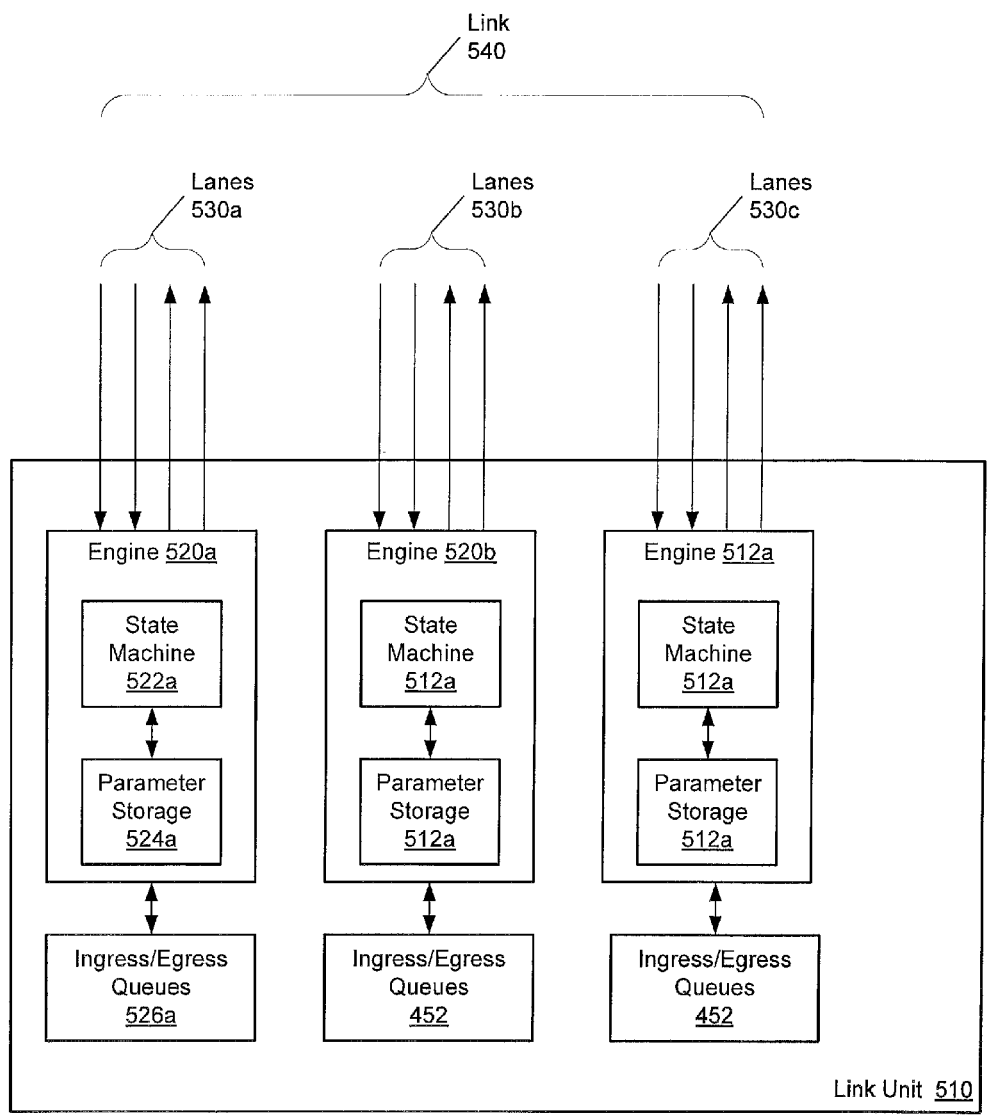
FIG. 5 is a generalized block diagram of one embodiment of a link unit.

Referring now to FIG. 5, a generalized block diagram of one embodiment of a link unit 510 is shown. In one embodiment, the link unit 510 includes engines 520a-520c, each corresponding to a given number of lanes. In one embodiment, each link includes four lanes. For example, the link 540 may include the lanes 530a-530c. Engine 520a is associated with lanes 530a, engine 520b is associated with lanes 530b, and engine 520c is associated with lanes 530c. In some embodiments, each one of the engines 520a-520c may be time shared among respective lanes. Each one of the engines 520a-520c may include a state machine connected to parameters storage. The parameter storage may include persistent storage for the first set of parameters as previously described. For example, the engine 520a includes the state machine 522a connected to the parameter storage 524a. Each one of the engines 520a-520c may also include at least one of the ingress/egress queues 526a-526c.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
control logic;
a plurality of nodes; and
a plurality of lanes between a first node and a second node of the plurality of nodes, the plurality of lanes comprising channel properties;
wherein each of the first node and the second node is configured to:
utilize initial values and reiterative steps to determine a time invariant set of parameters based at least in part on the channel properties and a time variant set of parameters based at least in part on clock data recovery within a corresponding node;

in response to receiving an indication from the control logic to disable the plurality of lanes, store the time invariant set of parameters in persistent storage; and in response to receiving an indication from the control logic to re-initialize the plurality of lanes, use the stored time invariant set of parameters as initial values and perform reiterative steps to re-determine each of the time invariant set of parameters and the time variant set of parameters.

2. The computing system as recited in claim 1, wherein when using the reiterative steps, an amount of time it takes to determine the time invariant set of parameters is greater than an amount of time it takes to determine the time variant set of parameters.

3. The computing system as recited in claim 1, wherein the time invariant set of parameters comprises at least one of the following: a voltage signal magnitude, an amplifier gain value, and channel loss and reflection values.

4. The computing system as recited in claim 1, wherein the time variant set of parameters comprises parameters used for aligning a receiver clock to a center of a data eye of a serialized data word transmitted between the first node and the second node.

5. The computing system as recited in claim 4-4, wherein the time invariant set of parameters comprises clock data recovery (CDR) circuits that track a phase and a frequency of an incoming serialized data stream.

6. The computing system as recited in claim 2, wherein each of the first node and the second node of the plurality of nodes is further configured to use the stored time invariant set of parameters to update each of the time invariant and the time variant set of parameters in response to detecting a re-adaptation condition is satisfied.

7. The computing system as recited in claim 6, wherein the re-adaptation condition comprises at least one of the following: (i) detecting temperature or voltage changes and (ii) detecting a given timing interval is reached.

8. The computing system as recited in claim 3, wherein the control logic is further configured to send an indication for disabling one or more of the lanes between the first node and the second node in response to determining a power down condition is satisfied.

9. The computing system as recited in claim 8, wherein the control logic is configured to convey a re-initialization condition responsive to a power up condition.

10. A method to be used in a computing system, the method comprising:
utilizing initial values and reiterative steps to determine a time invariant set of parameters based at least in part on the channel properties and a time variant set of parameters based at least in part on clock data recovery within a corresponding node;

in response to receiving an indication to disable the plurality of lanes, storing the time invariant set of parameters in persistent storage;

in response to receiving an indication to re-initialize the lanes, using the stored time invariant set of parameters as initial values and perform reiterative steps to re-determine each of the time invariant set of parameters and the time variant set of parameters; and sending an indication for re-initializing one or more of the lanes between the first node and the second node in response to determining a re-initialization condition is satisfied.

11. The method as recited in claim 10, wherein when using the reiterative steps, an amount of time it takes to determine using the reiterative steps the time invariant set of parameters is greater than an amount of time it takes to determine the time variant set of parameters.

12. The method as recited in claim 10, wherein the time invariant set of parameters comprises at least one of the following: a voltage signal magnitude, an amplifier gain value, and channel loss and reflection values.

13. The method as recited in claim 10, wherein the time variant set of parameters comprises parameters used for aligning a receiver clock to a center of a data eye of a serialized data word transmitted between the first node and the second node.

14. The method as recited in claim 13, wherein the time invariant set of parameters comprises clock data recovery (CDR) circuits that track a phase and a frequency of an incoming serialized data stream.

15. The method as recited in claim 11, further comprising using the stored time invariant set of parameters to update each of the time invariant and the time variant set of parameters in response to detecting a re-adaptation condition is satisfied.

16. The method as recited in claim 15, wherein the re-adaptation condition comprises at least one of the following: (i) detecting temperature or voltage changes and (ii) detecting a given timing interval is reached.

17. An apparatus for reducing power consumption during data transmission comprising:
a transmitter for sending data;
a receiver for receiving the data; and
a plurality of lanes between the transmitter and the receiver, the plurality of lanes comprising channel properties;

wherein each of the transmitter and the receiver is configured to:
utilize initial values and reiterative steps to determine a time invariant set of parameters based at least in part on the channel properties and a time variant set of parameters based at least in part on clock data recovery within a corresponding node;

in response to receiving an indication from the control logic to disable the plurality of lanes, store the time invariant set of parameters in persistent storage; and in response to receiving an indication from the control logic to re-initialize the plurality of lanes, use the stored time invariant set of parameters as initial values and perform reiterative steps to re-determine each of the time invariant set of parameters and the time variant set of parameters.

18. The apparatus as recited in claim 17, wherein when using the reiterative steps, an amount of time it takes to determine using the reiterative steps the time invariant set of parameters is greater than an amount of time it takes to determine the time variant set of parameters.

19. The apparatus as recited in claim 17, wherein the time invariant set of parameters comprises at least one of the following: a voltage signal magnitude, an amplifier gain value, and channel loss and reflection values.

20. The apparatus as recited in claim 17, wherein the time variant set of parameters comprises parameters used for aligning a receiver clock to a center of a data eye of a serialized data word transmitted between the transmitter and the receiver.

* * * * *

UNITED STATES PATENT AND TRADEMARK OFFICE
CERTIFICATE OF CORRECTION

PATENT NO. : 9,052,900 B2
APPLICATION NO. : 13/753130
DATED : June 9, 2015
INVENTOR(S) : Zhang et al.

Page 1 of 1

It is certified that error appears in the above-identified patent and that said Letters Patent is hereby corrected as shown below:

Specification

In column 6, line 51, after "clock" insert -- . --.

In column 6, line 59, after "bits" insert -- . --.

In column 6, line 61, after "data" insert -- . --.

In column 8, line 23, after "trace" insert -- . --.

In column 8, line 26, after "filter" insert -- . --.

Claims

In column 15, line 25, in Claim 5, delete "claim 4-4," and insert -- claim 4, --, therefor.

Signed and Sealed this
Twenty-third Day of February, 2016

Michelle K. Lee
*Director of the United States Patent and Trademark Office*